(12) United States Patent
Girault

(10) Patent No.: US 7,228,418 B1
(45) Date of Patent: Jun. 5, 2007

(54) AUTHENTICATION AND SIGNATURE METHOD FOR MESSAGES USING REDUCED SIZE OF BINARY UNITS OF INFORMATION CONTENT AND CORRESPONDING SYSTEMS

(75) Inventor: Marc Girault, Caen (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/937,786

(22) PCT Filed: Apr. 7, 2000

(86) PCT No.: PCT/FR00/00890

§ 371 (c)(1),
(2), (4) Date: Sep. 28, 2001

(87) PCT Pub. No.: WO00/62477

PCT Pub. Date: Oct. 19, 2000

(30) Foreign Application Priority Data

Apr. 8, 1999 (FR) .................................. 99 04398

(51) Int. Cl.
*H04L 9/32* (2006.01)
*G06F 7/04* (2006.01)
(52) U.S. Cl. ........................................ 713/170; 726/9
(58) Field of Classification Search ................ 713/168, 713/170; 726/9, 20
See application file for complete search history.

(56) References Cited

U.S. PATENT DOCUMENTS 6,134,591 A * 10/2000 Nickles ....................... 709/229
6,651,167 B1 * 11/2003 Terao et al. ................. 713/168

FOREIGN PATENT DOCUMENTS

EP 0 697 687 3/1995
FR 2 716 058 2/1994

OTHER PUBLICATIONS

Schneier, Bruce. Applied Cryptography. Second Edition. John Wiley & Sons, Inc. 1996. pp. 86-87 and 151-168.*

* cited by examiner

Primary Examiner—Emmanuel L. Moise
Assistant Examiner—Michael Pyzocha
(74) Attorney, Agent, or Firm—Pearne & Gordon LLP

(57) ABSTRACT

The present invention relates to an authentication method using small-sized commitments and systems thereof.

According to the invention the size of the commitment is reduced but the time the entity to be authenticated takes to respond to the authenticating entity is checked and said time is required to be lower than a certain value. The security level is maintained.

Application to methods of authentication (of entities or messages) or message signature.

22 Claims, No Drawings

AUTHENTICATION AND SIGNATURE METHOD FOR MESSAGES USING REDUCED SIZE OF BINARY UNITS OF INFORMATION CONTENT AND CORRESPONDING SYSTEMS

FIELD OF THE INVENTION

The present invention relates to a message authentication and signature method using small-sized commitments and systems thereof.

The invention concerns the field of identification, i.e. entity authentication, and that of the authentication of messages and digital message signature using cryptographic techniques.

More precisely, the invention concerns cryptography known as public key cryptography. In this field the entity to be authenticated has a secret key and an associated public key. The authenticating entity only requires the public key to perform the authentication.

Even more precisely, the invention concerns those authentication methods known as zero-knowledge. This means that the authentication is performed according to a protocol which, as has been proved and according to hypotheses that the scientific world recognizes as being perfectly reasonable, reveal nothing about the secret key of the entity to be authenticated.

The invention has applications in all the systems where it is necessary to authenticate entities or messages or sign messages and, in particular, in systems in which the number of bits transmitted and/or stored constitute a critical parameter. This is particularly the case of cards with standard or inexpensive microcircuits that are not provided with a math coprocessor (often called a cryptographic coprocessor) to accelerate the cryptographic computations.

A typical application of the invention is that of the electronic wallet that requires a very high level of security while excluding the use of a cryptographic coprocessor either for cost reasons or for technical reasons (for example the use of a contact-free interface) or for both.

Another possible application is that of future generation telephone cards for which price is even more of a consideration than for electronic wallets.

BACKGROUND ART

Many zero-knowledge identification protocols are known. Among others, the four following protocols may be cited:

1) The Fiat-Shamir protocol described in: A. Fiat and A. Shamir, "Howe to prove yourself: Practical solutions to identification and signature problems", published in Advances in Cryptology; Proceedings of Crypto '86, Lecture Notes in Computer Science, vol. 263, Springer-Verlag, Berlin, 1987, pp. 186–194;

2) The Guillou-Quisquater protocol described in: L. C. Guillou and J. J. Quisquater, "A practical zero-knowledge protocol fitted to security microprocessors minimizing both transmission and memory", published in Advances in Cryptology: Proceedings of Eurocrypt '88, Lecture Notes in Computer Science, vol. 330, Springer-Verlag, Berlin, 1988, pp. 123–128;

3) The Schnorr protocol described in: C. P. Schnorr, "Efficient identification and signatures for smart cards", published in Advances in Cryptology: Proceedings of Crypto '89, Lecture Notes in Computer Science, vol. 435, Springer-Verlag, Berlin, 1987, pp. 239–252;

4) The Girault protocol described in French patent application FR-A-2 716 058.

In general, most zero-knowledge authentication protocols are performed in 4 stages. In order to simplify matters, it will be supposed that the authenticating entity, called B, already knows all the public parameters that are characteristic of the entity to be authenticated, called A, in other words its identity, public key, etc. The four stages are then as follows:

Stage 1:

A provides B with at least one commitment c consisting either of a parameter x chosen at random by A or of a pseudo-random function h of parameter x and, if appropriate, the message to be authenticated or signed: c=h (x, [M]), (the notation [M] signifies that M is optional).

Stage 2:

B selects a parameter e called "question" at random and transmits e to A.

Stage 3: A provides B with a response y, which is coherent with question e, commitment c and public key v of A.

Stage 4: B computes x from elements y, e and v, i.e. $x=\phi(y, e, v)$ then checks that: $c=h(\phi(v, e, y), [M])$.

In certain protocols there are one or two additional exchanges between A and B. For message signatures, the two initial exchanges are eliminated and parameter e is selected equal to c: A only computes successively c, e (i.e. c) and y.

The number u of questions that can be selected by B is linked directly to the security level of the protocol on which the probability of success of an imposter (i.e. an entity C that makes a fraudulent attempt to pretend to be A) is dependent. The security level, which is called p, is characterized by a parameter k according to the relation $p=1-2^{-k}$. In other words, imposters have only one chance in $2^k$ of carrying out their imposture successfully. It may be proved that if the protocol is based on a difficult mathematical problem and if the commitments are of sufficient length then the length of u must be equal to k bits. In other words, the question must be selected from the set $\{0, \ldots, 2^k-1\}$ (including limiters).

In the background art k is equal to 32 bits, which gives only one chance in four billion of an imposture being successful. In applications where identification failure can have very damaging consequences, such as prosecution, the length may be reduced to several bits.

None of the above-mentioned protocols can be implemented in the basic version in high-requirement applications, such as those described above, because the computing operations required cannot be performed by a smart card that is not equipped with a cryptographic coprocessor.

A first optimization, introduced by Fiat and Shamir, concerns the number of bits exchanged between the two entities. Said optimization consists in using a hash function in the computing operation of the commitment. The optimization itself does not reduce the number of computing operations performed by the authenticated entity because the commitment continues to be computed by the optimization.

In order to reduce the number of computing operations a particular procedure, called a pre-computation mode, must be used that consists in computing in advance the parameters, called pre-commitments, that are included in the computing operation of the commitments. The commitments can also be computed by a server with greater computing power and then stored in the smart card of the entity to be authenticated. When the electronic transaction actually takes place the smart card has only rudimentary computing operations to perform. This operating procedure is disclosed in French patent application FR-A-2 716 058 cited above. Each pre-commitment is used for one transaction only. When all the pre-commitments have been consumed by the card it is necessary to compute new ones and store them in the card (recharging operation).

Since the data memory of an inexpensive smart card rarely exceeds 8 Kbytes, it is difficult to imagine dedicating more than 1 Kbyte to storing pre-commitments alone. It is therefore necessary to reduce the size of said pre-commitments to a minimum in order to perform a maximum number of transactions between two recharges.

In all these authentication methods a computing operation capacity may be defined that is the maximum number of computing operations that the implemented means can perform in a reasonable time. As the computing operations are binary the capacity may be expressed as a power of 2, for example $2^N$ where N is an integer. The number is not determined with great accuracy but is defined to within a few units. For example, at present integer N is of the order of approximately 80, in other words with only the means available the capacity is $2^{80}$, i.e. a maximum of approximately $2^{80}$ operations may be performed in a reasonable time.

In the basic version of the method described in French patent application FR-A-2 716 058 cited above, the size of the pre-commitments or the commitments themselves is approximately 2N bits where number N is equal to approximately 80. The size of a pre-commitment is therefore approximately 160 bits (it is 128 bits in the document cited above where N is taken as 64). Fifty commitments can therefore be stored in a 1-Kbyte memory, which is relatively few.

In another French patent application FR-A-2 752 122 an authentication method is described that reduces the number of bits to be transmitted or stored. The size of the pre-commitments or commitments can be reduced to a little more than N bits, i.e. approximately 88 if N=80, which enables more than 90 pre-commitments to be stored in a 1-Kbyte memory and to reduce the bits transmitted to 18% when the protocol is performed.

Unfortunately, this gain remains insufficient for many applications, particularly for the electronic wallet. Many transactions may only concern very small amounts, such as for public transport, parking meters, local telecommunications, etc., and the user must be able to perform transactions until the credit runs out without being limited by any other consideration. In this context, a minimum 150 to 200 transactions without recharge would appear to be required, which the known methods do not allow.

The aim of the present invention is precisely to further reduce the size of the pre-commitments and, optionally, the commitments themselves. According to the invention the number of bits can be reduced to approximately 48 which enables 170 pre-commitments to be stored in a 1-Kbyte memory. In certain applications the size may be even smaller and, for example, be reduced to 32 bits which enables 256 pre-commitments to be stored.

The invention therefore enables quick performance of an algorithm of identification or authentication of a message or signature of a message in an inexpensive smart card for applications such as electronic wallets or future generation telephone cards.

DISCLOSURE OF THE INVENTION

The invention is based on the following observation: the computing capacity is considerably reduced (typically $2^{16}$ instead of $2^{80}$) if a fraudor is forced to perform computing operations in a short time using reduced means of computation.

Based on the above observation, the invention proposes to measure the time $\Delta t$ taken by the entity to be authenticated to reply to the authenticating entity and to limit said time to a maximum value $\Delta t_{max}$.

In the time $\Delta t_{max}$, the means implemented have a computing capacity equal to $2^P$ (according to the considerations developed above). Said number $2^P$ is clearly lower than number $2^N$ due to the restricted time allowed to perform the computing operations. The invention therefore proposes taking number k+P or a number that is greater but that remains lower than k+N as a size of the pre-commitments or commitments. Typically, number P can be approximately 16 such that if k=32 the size of the pre-commitment or commitment will be 32+16, i.e. 48 bits or slightly more (as compared with 128 or 88 bits in the two patent applications cited above).

Two options are therefore possible:
  a first option in which question e, the size of which in the background art was k bits, is extended typically to give a size of approximately 64 bits;
  a second option in which a preliminary exchange is added to the protocol during which B sends a random number w to A (typically 32 bits), number w constituting an additional parameter used to compute commitment c: c=h($\alpha$, w, [M]); the time $\Delta t$ to be measured is then that between sending the preliminary exchange and receiving parameters e and y. The question posed e can then maintain the size of k bits.

The second option must be used for a message signature. The advantage of the second option is that the size of question e remains reduced. In certain protocols, however, (particularly those of Fiat-Shamir and Guillou-Quisquater) the computation time of response y is greatly dependent on the length of e whereas the computation time of commitment c depends very little on the length of w. For these protocols the second option therefore reduces the size of the commitments without increasingly significantly the time required to perform the protocol. Moreover, only the second option is possible for message signature because, strictly speaking, there is no longer any question.

The security level of the protocol of the invention, i.e. the minimum probability of detecting an impostor, is equivalent to that of known protocols $(1-2^{-k})$ whereas the length of the pre-commitments or commitments is almost divided by four. The equivalent security levels may be seen as follows: C is a fraudor pretending to be A (or is pretending message M comes from A). Obviously C does not know the secret key of A. C can only implement three main strategies: fraud by guessing, real-time fraud (performed during the transaction) and deferred fraud (performed before the transaction). These strategies can also be combined:

a) Fraud by guessing:
    first option: C guesses the value of question e by selecting it at random, selects response y at random and computes c=h ($\phi$(v, e, y), [M]) then starts the transaction with said value c. C will only succeed provided e has been guessed correctly, therefore with a probability of $2^{-64}$.
    second option: C guesses the value of question e by selecting it at random, selects response y at random and computes c=h ($\phi$(v, e, y),w, [M]). This is only possible once w is known, i.e. during the transaction. C then starts the transaction with said value c. C will only succeed provided e has been guessed correctly, therefore with a probability of $2^{-64}$.

b) Real-time fraud:

Once a value of c has sent been sent at random and a value e has been received C performs exhaustive attempts to find a value of y that satisfies the verification equation c=h ($\phi$(v, e, y), [M]). As C can perform a maximum of $2^P$ attempts and as the number of possible values of c is $2^{k+p}$ the probability of success is $1/2^k$, as required.

c) Deferred fraud:

first option: C computes a large number of values of c based on various values of y and e. As C can compute a maximum of $2^N$ there are approximately $2^{N-P-k}$ matching values of y and e for each possible value of c. C selects a value at random, stores the matching values of y and e and initiates the protocol. As there are $2^{N-P}$ possible values of e the probability of C storing the value received from B is once again lower than $1/2^k$, as required.

second option: the computing operation is basically the same as for the first option because the total size of the two random numbers w and e is equal to the size of e in the second option.

More precisely, the aim of the present invention is therefore an authentication method that implements a first entity known as "to be authenticated" (A) and a second entity known as "authenticating" (B), said method comprising the following operations:

the entity to be authenticated (A) sends at least one commitment c to the authenticating entity (B), said commitment being of a certain size counted in the number of bits, the authenticating entity (B) receives commitment c, selects a number e called "question" at random and sends said question e to the entity to be authenticated (A).

the entity to be authenticated (A) receives question e, performs the computing operations using said question e, the result of said computing operations constituting a response y, and sends said response y to the authenticating entity (B), the authenticating entity (B) receives response y, performs a computing operation using said response y and checks that the computing operation results in the commitment c received, a security level equal to $1-2^{-k}$ being obtained for said authentication where k is an integer determined according to the security level required, said method being characterized in that the authenticating entity (B) measures the time $\Delta t$ between the moment when it is sent to the entity to be authenticated (A) and the moment when it receives the response from the entity to be authenticated (A) and it checks that the time measured $\Delta t$ is shorter than a determined time $\Delta t_{max}$ and in that because the entity to be authenticated (A) has a computing capacity of approximately $2^P$ in said determined time $\Delta t_{max}$ the size of the commitment used by the entity to be authenticated (A) is equal to at least (k+P) bits.

In this definition it should be understood that the size may either be equal to (k+P) bits or greater than this number by several units.

In one particular implementation mode the entity to be authenticated (A) computes the commitment based on a pre-commitment computed in advance the size of which is equal to at least (k+P) bits. The entity to be authenticated can, however, compute the commitment by selecting a number at random and computing from said number.

In another implementation version the authenticating entity (B) selects a number w at random in a preliminary operation and sends said number w to the entity to be authenticated (A) that uses said number w to constitute the commitment, question e posed by authenticating entity (B) having a number of bits equal to k, the time measured being the time between the moment the authenticating entity (B) sends number w to the entity to be authenticated (A) and the moment the authenticating entity (B) receives response y from the entity to be authenticated (A).

Another aim of the present invention is a message signature method in which a first entity known as a "prover" (A) and a second entity known as a "authenticator" B are implemented, said method comprising the following stages:

the prover entity (A) computes a number e according to the message to be signed, computes a number y called the response and sends the response to the authenticating entity (B), the authenticating entity (B) receives response y, performs a computing operation using said response y and checks the computing operation results in number e, a security level equal to $1-2^{-k}$ being obtained for said signature where k is an integer determined according to the security level required, said method being characterized in that:

the prover entity (A) computes a number e the size of which is equal to at least (k+P) bits where $2^P$ indicates the computing capacity of the entity to be authenticated (A) in a determined time $\Delta t_{max}$, in a preliminary operation authenticating entity (B) selects a number w at random and sends said number w to the prover entity (A) that uses number w to constitute number e, the authenticating entity (B) measures the time $\Delta t$ between the moment it sends number w to the prover entity (A) and the moment it receives the response from the prover entity (A) and it checks that the time measured $\Delta t$ is shorter than the determined time $\Delta t_{max}$.

Once again the prover entity can compute number e based on a pre-commitment computed in advance the size of which, to within several units, is equal to at least (k+P) bits.

The present invention also relates to a system comprising a first entity known as "to be authenticated" (A) and a second entity known as "authenticating" (B) in which:

the entity to be authenticated (A) comprises means for sending at least one commitment c to the authenticating entity (B), said commitment being of a certain size counted in the number of bits, the authenticating entity (B) comprises means for receiving commitment c, for selecting a number e called "question" at random and for sending said question e to the entity to be authenticated (A), the entity to be authenticated (A) comprises means for receiving question e, for performing computing operations using said question e, the result of said computing operations constituting a response y, and for sending said response y to the authenticating entity (B), the authenticating entity (B) comprises means for receiving response y, for performing a computing operation using said response y and for checking that the computing operation results in the commitment c received, a security level equal to $1-2^{-k}$ being obtained for said authentication where k is an integer determined according to the security level required, said system being characterized in that the authenticating entity (B) comprises means for measuring the time $\Delta t$ between the moment when it is sent to the entity to be authenticated (A) and the moment when it receives the response from the entity to be authenticated (A) and means for checking that the time measured Δt is shorter than a determined time $\Delta t_{max}$ and in that because the entity to be authenticated (A) has a computing capacity of approximately $2^P$ in said determined time $\Delta t_{max}$ the size of the commitment used by the entity to be authenticated (A) is equal to at least (k+P) bits.

In one embodiment the entity to be authenticated (A) comprises means for computing the commitment based on a pre-commitment computed in advance the size of which is equal to at least (k+P) bits.

Number P can be equal to 16 and number k to 32, the size of the pre-commitment or commitment therefore being equal to at least 48 bits.

Question e posed by the authenticating entity (B) can have a greater number of bits than k.

The authenticating entity (B) can comprise means for selecting a number w at random in a preliminary operation and for sending said number w to the entity to be authenticated (A) that uses said number w to constitute the commitment c, question e posed by authenticating entity (B) having a number of bits equal to k, the means for measuring the time Δt being capable of measuring the time between the moment the authenticating entity (B) sends number w to the entity to be authenticated and the moment the authenticating entity (B) receives response y from the entity to be authenticated (A).

Another aim of the present invention is a system comprising a first entity known as a "prover" (A) and a second entity known as a "authenticator" B in which:

the prover entity (A) comprises means for computing a number e as a function of the message to be signed and for computing a number y called a response and for sending the response to the authenticating entity (B), the authenticating entity (B) comprises means for receiving response y, for performing a computing operation using said response y and checking that the computing operation results in number e, a security level equal to $1-2^{-k}$ being obtained for said signature where k is an integer determined according to the security level required, said system being characterized in that:

the prover entity (A) comprises means for computing a number e the size of which is equal to at least (k+P) bits where $2^P$ indicates the computing capacity of the entity to be authenticated (A) in a determined time $\Delta t_{max}$, in a preliminary operation authenticating entity (B) comprises means for selecting a number w at random and for sending said number w to the prover entity (A) that uses number w to constitute number e, the authenticating entity (B) comprises means for measuring the time Δt between the moment it sends number w to the prover entity (A) and the moment it receives the response from the prover entity (A) and means for checking that the time measured Δt is shorter than the determined time $\Delta t_{max}$.

The prover entity (A) can comprise means for computing number e based on a pre-commitment computed in advance the size of which is equal to or at least (k+P) bits.

Number P can be equal to 16 and number k to 32, the size of the pre-commitment or number e therefore being equal to at least 48 bits.

Detailed description of particular embodiments

In the description that follows it is assumed that the invention applies to the technique disclosed in French patent application FR-A-2 716 058 cited above, a technique in which the modular multiplications are eliminated, particularly in the operation of stage 3. There is no need therefore to allow for this type of operation in smart cards when the pre-computation mode is used. Clearly, this example does not limit the scope of the invention that can be used with modular multiplication protocols.

The protocols of the application cited above are based on the difficulty of computing discrete logarithms. The general parameters, i.e. those shared by all the users, are as follows:
a large compound number n,
an integer α (the base),
four parameters t, k, u, z, where k is the security parameter.

The recommended length of n is at least 512 bits but preferably 768 bits or more. A typical security parameter k is 32. Parameter u refers to the number of possible questions, therefore $u=2^k$. A typical value of the length of t is 160 bits. A typical value of the length of z is 64 bits.

The secret key of a user is an integer s lower than t. Its public key is: $v=\alpha^{31\ s}$ (mod n).

The basic authentication protocol disclosed in the earlier application is as follows:

1. A chooses an integer r at random from $\{0 \ldots tuz-1\}$, computes $x=\alpha^r$ (mod n) and sends c to B.

2. B selects an element e at random from $\{0 \ldots 2^k-1\}$ and sends e to A.

3. A computes $y=r+se$ and sends y to B.

4. B checks that $x=\alpha^y v^e$ (mod n).

It may be noted that an imposter, who is assumed not to know s, can deceive a authenticator with a probability equal to $2^{-k}$ by selecting an integer y, an element e and by computing x as in stage 4. As it can be proved that even though the problem of the discrete logarithm may be difficult it cannot significantly improve the probability, the security level is therefore equal to $1-2^{-k}$.

In order to reduce the number of bits transmitted $c=h(x)$ can be used as a commitment, as suggested by Fiat and Shamir, in which h is a pseudo-random function. The verification equation of stage 4 then becomes:

$c=h(\alpha^y v^e(\text{mod } n))$.

Furthermore, if it is necessary to authenticate a message M, M is included in the computation of the commitment: $c=h(x, M)$.

In order to maintain a security level equal to $1-2^k$ it is necessary for the length of c to be at least 160 bits, all the other parameters being unchanged.

As the above patent has now been cited as a reminder, the protocol of the present invention may be described in a version that uses the first option. N=80 and P=16 and it is assumed that the lengths of the pre-commitment and commitment are both reduced to a minimum, i.e. 48 bits, said reduction being compensated for by an increase in the length of e to 64 bits. Moreover, in stage 4 B checks the time taken by A. The security level of the modified protocol therefore remains equal to $1-2^k$. The stages of the method of the invention are then as follows:

1. A selects an integer r at random from $\{0 \ldots tuz-1\}$, computes $x=\alpha^r(\text{mod } n)$, then possibly $c'=f(x)$ that belongs to $\{0 \ldots 2^{48}-1\}$, then $c=h(x, w, [M])$ or $c=h(x', W, [M])$ that belongs to $\{0 \ldots 2^{48}-1\}$ and sends c to B.

2. B selects an element e at random from $\{0 \ldots 2^{64}-1\}$ and sends e to A.

3. A computes y=r+se and sends y to B.

4. B checks that $c=h(\alpha^y v^e \pmod{n}, [M])$ or $c=h(f(\alpha^y v^e \pmod{n}), [M])$ and that the time between transmission in stage 2 and reception in stage 3 is shorter than 1 or 2 seconds.

The invention is particularly suited to this type of basic protocol because it does not result in any changes of the main general parameters, i.e. n and $\alpha$, or even any individual parameters, i.e. the user's secret and public keys. On the other hand, it implies an extension of e because u is now equal to $2^{54}$, which would no longer be the case, however, if the second option were adopted.

Most importantly, the invention is also particularly useful in the pre-computation mode because the size of the pre-commitments is reduced to 48 bits. It is clear, nevertheless, that not only the pre-commitments but also the matching values of r must previously be stored. It is, however, possible to avoid this by generating the numbers using a pseudo-random generator contained in the security device of A, as described in French patent application FR-A-2 716 058 cited above.

If the second option is selected the method comprises a previous additional stage called 0 and becomes as follows:

0. B selects a random number w from $\{0 \ldots 2^{32}-1\}$ and sends it to A.

1. 1. A selects an integer r at random from $\{0 \ldots tuz-1\}$, computes $x=\alpha^r \pmod{n}$, then possibly $x'=f(x)$ that belongs to $\{0 \ldots 2^{48}-1\}$, then $c=h(x, w, [M])$ or $c=h(x', w, [M])$ that belongs to $\{0 \ldots 2^{48}-1\}$ and sends c to B.

2. B selects an element e at random from $\{0 \ldots 2^{32}-1\}$ and sends e to A.

3. A computes y=r+se and sends y to B.

4. B checks that $c=h(\alpha^y v^e \pmod{n}, w, [M])$ or $c=h(f(\alpha^y v^e \pmod{n}), w, [M])$ and that the time between transmission in stage 0 and reception in stage 3 is shorter than one or several seconds.

Finally, the signature protocol is as follows:

0. B selects a random number w from $\{0 \ldots 2^{64}-1\}$ and sends it to A.

1. 1. A selects an integer r at random from $\{0 \ldots tuz-1\}$, computes $x=\alpha^r \pmod{n}$, then possibly $x'=f(x)$ that belongs to $\{0 \ldots 2^{48}-1\}$.

2. A computes $e=h(x, w, [M])$ that belongs to $\{0 \ldots 2^{48}-1\}$.

3. A computes y=r+se and sends (e, y) to B.

4. B checks that $e=h(\alpha^y v^e \pmod{n}, w, [M])$ and that the time between transmission in stage 0 and reception in stage 3 is shorter than one or several seconds.

The invention claimed is:

1. An authentication method that implements a first entity known as "to be authenticated" (A) and a second entity known as "authenticating" (B) to a desired security level, said method comprising the steps of:

determining P by taking the entity to be authenticated (A) as having a computation capacity of $2^P$ in a determined time ($\Delta t_{max}$), with said P ranging between 0 and 80, determining an integer k such that the desired security level is equal to $1-2^{-k}$, the entity to be authenticated (A) sending at least one pre-commitment or commitment c to the authenticating entity (B), said pre-commitment or commitment being made at least (k+P) bits long, the authenticating entity (B) receiving said pre-commitment or commitment c, and thereupon selecting a number e called "question" at random and then sending said question e to the entity to be authenticated (A).

the entity to be authenticated (A) receiving said question e, and performing computing operations using said question e, the result of said computing operations constituting a response y, and then sending said response y to the authenticating entity (B), the authenticating entity (B) receiving said response y, and then performing a computing operation using said response y and checking that the computing operation results in the pre-commitment or commitment c having been received, authenticating entity (B) measuring the time $\Delta t$ between the moment when the entity to be authenticated (A) is being addressed by entity (B) and the moment when entity (B) receives the response from the entity to be authenticated (A), and authenticating entity (B) checking that the measured time $\Delta t$ is shorter than the determined time $\Delta t_{max}$, thereby resulting in entity (B) authenticating the identity of entity (A).

2. The authentication method of claim 1 wherein the entity to be authenticated (A) computes the pre-commitment or commitment based on a pre-commitment computed in advance the size of which is equal to at least (k+P) bits.

3. The authentication method of claim 1 wherein number P is equal to 16 and number k to 32, the size of the pre-commitment or commitment therefore being equal to at least 48 bits.

4. The authentication method of claim 1 wherein question e posed by authenticating entity (B) has a number of bits greater than k.

5. The authentication method of claim 4 wherein as number k is equal to 32 question e posed by the authenticating entity (B) has a number of bits equal to about 64, but less than 80.

6. The authentication of claim 1 wherein the authenticating entity (B) selects a number w at random in a preliminary operation and sends said number w to the entity to be authenticated (A) that uses said number w to constitute the pre-commitment or commitment c, question e posed by the authenticating entity (B) having a number of bits equal to k, the time ($\Delta t$) being measured between the moment the authenticating entity (B) sends number w to the entity to be authenticated and the moment the authenticating entity (B) receives response y from the entity to be authenticated (A).

7. The authentication method of claim 6 wherein number w previously provided from the authenticating entity (B) to the entity to be authenticated (A) has about 32 bits, the size of the pre-commitment or commitment being equal to or at least 48 bits, the number of bits of question e posed by the authenticating entity (B) being equal to about 32, wherein the number of bits of w is less than 80 bits.

8. The authentication method of claim 1 wherein the entity to be authenticated (A) introduces a message (M) in the constituted pre-commitment or commitment, the authentication also then applying to the message (M).

9. A message signature method wherein a first entity known as a "prover" (A) and a second entity known as a "authenticator" (B) are implemented, to a desired security level, said method comprising the steps of:

determining P by taking the prover entity (A) as having a computation capacity of $2^P$ in a determined time $\Delta t_{max}$, with said P ranging between 0 and 80, determining an integer k such that the desired security level is equal to $1-2^{-k}$, in a preliminary operation, authenticating entity (B) selecting a number w at random and sending the number w to the prover entity (A), the prover entity (A) computing, as a function of the number w and of the message to be signed, a number e the size of which is equal to at least (k+P) bits, and computing a number y called a response, which is a function of e, and sending the response to the authenticating entity (B), the authenticating entity (B) receiving the response y, performing a computing operation using said response y and checking that the computing operation results in number e, the authenticating entity (B) measuring the time Δt between the moment entity (B) sends number w to the prover entity (A) and the moment entity (B) receives the response y from the prover entity (A), and entity (B) checking that the measured time Δt is shorter than the determined time $\Delta t_{max}$, thereby resulting in entity (B) authenticating the message sent by entity (A).

10. The message signature method of claim 9 wherein the prover entity (A) computes number e based on a pre-commitment computed in advance the size of which is equal to at least (k+P) bits.

11. The message signature method of claim 9 wherein number P is equal to 16 and number k to 32, the size of the pre-commitment or number e being at least equal to 48 bits.

12. A system comprising a first entity known as "to be authenticated" (A) and a second entity known as "authenticating" (B), said system comprising:

means for determining P by taking the entity to be authenticated (A) as having a computation capacity of $2^P$ in a determined time ($\Delta t_{max}$), with said P ranging between 0 and 80, means for determining an integer k such that the desired security level is equal to $1-2^{-k}$, the entity to be authenticated (A) comprising means for sending at least one pre-commitment or commitment c to the authenticating entity (B), said pre-commitment or commitment being made at least (k+P) bits long, the authenticating entity (B) comprising means for receiving the pre-commitment or commitment c, and thereupon selecting a number e called "question" at random and then sending said question e to the entity to be authenticated (A), the entity to be authenticated (A) comprising means for receiving said question e, for performing computing operations using said question e, the result of said computing operations constituting a response y, and then sending said response y to the authenticating entity (B), the authenticating entity (B) comprising means for receiving the response y, for performing a computing operation using said response y and for checking that the computing operation results in the pre-commitment or commitment c having been received, means for authenticating entity (B) by measuring the time Δt between the moment when the entity to be authenticated (A) is being addressed by entity (B) and the moment when entity (B) receives the response from the entity to be authenticated (A), and means for authenticating entity (B) by checking that the measured time Δt is shorter than the determined time $\Delta t_{max}$, thereby resulting in entity (B) authenticating the identity of entity (A).

13. The system of claim 12 wherein the entity to be authenticated (A) comprises means for computing the pre-commitment or commitment based on a pre-commitment computed in advance the size of which is equal to at least (k+P) bits.

14. The system of claim 12 wherein number P is equal to 16 and number k to 32, the size of the pre-commitment or commitment therefore being equal to at least 48 bits.

15. The system of claim 12 wherein question e posed by the authenticating entity (B) has a number of bits greater than k.

16. The system of claim 15 wherein as number k is equal to 32, question e posed by the authenticating entity (B) has a number of bits equal to about 64, but less than 80.

17. The system of claim 12 wherein the authenticating entity (B) comprises means for selecting a number w at random in a preliminary operation and for sending said number w to the entity to be authenticated (A) that uses said number w to constitute the pre-commitment or commitment c, question e posed by authenticating entity (B) having a number of bits equal to k, the means for measuring the time (Δt) being capable of measuring the time between the moment the authenticating entity (B) sends number w to the entity to be authenticated (A) and the moment the authenticating entity (B) receives response y from the entity to be authenticated (A).

18. The system of claim 17 wherein number w previously provided from the authenticating entity (B) to the entity to be authenticated (A) has about 32 bits, the size of the pre-commitment or commitment being equal to or at least 48 bits, the number of bits of question e posed by the authenticating entity (B) being equal to about 32, wherein the number of bits of w is less than 80 bits.

19. The system of claim 12 wherein the entity to be authenticated (A) comprises means capable of introducing a message (M) in the constituted pre-commitment or commitment, the authentication also then applying to the message (M).

20. A system for authenticating a message having a signature, said system comprising a first entity known as a "prover" (A) and a second entity known as a "authenticator" (B), said system further comprising:

means for determining P by taking the prover entity (A) as having a computation capacity of $2^P$ in a determined time $\Delta t_{max}$, with said P ranging between 0 and 80, means for determining an integer k such that the desired security level is equal to $1-2^{-k}$, means for authenticating, in a preliminary operation, entity (B) by selecting a number w at random and sending the number w to the prover entity (A), the prover entity (A) comprising means for computing, as a function of the number w and of the message to be signed, a number e the size of which is equal to at least (k+P) bits, and afor computing a number y called a response and for sending the response to the authenticating entity (B), the authenticating entity (B) comprising means for receiving response y, for performing a computing operation using said response y and checking that the computing operation results in number e, the authenticating entity (B) comprising means for measuring the time Δt between the moment entity (B) sends number w to the prover entity (A) and the moment entity (B) receives the response from the prover entity (A) and means for checking that the measured time Δt is shorter than the determined time $\Delta t_{max}$, thereby resulting in entity (B) authenticating the message sent by entity (A).

21. The system of claim 20 wherein the entity to be authenticated (A) comprises means for computing number e based on a pre-commitment computed in advance the size of which is equal to at least (k+P) bits.

22. The system of claim 20 wherein number P is equal to 16 and number k to 32, the size of the pre-commitment or commitment therefore being equal to at least 48 bits.

* * * * *